United States Patent
Higashino

(10) Patent No.: US 9,352,769 B2
(45) Date of Patent: May 31, 2016

(54) STEERING APPARATUS

(71) Applicant: NSK Ltd., Tokyo (JP)

(72) Inventor: Kiyoharu Higashino, Takasaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/347,638

(22) PCT Filed: Dec. 20, 2013

(86) PCT No.: PCT/JP2013/084302
§ 371 (c)(1),
(2) Date: Mar. 27, 2014

(87) PCT Pub. No.: WO2014/174727
PCT Pub. Date: Oct. 30, 2014

(65) Prior Publication Data
US 2015/0291203 A1  Oct. 15, 2015

(30) Foreign Application Priority Data

Apr. 24, 2013  (JP) .................................. 2013-091338

(51) Int. Cl.
*B62D 1/184* (2006.01)
*B62D 1/189* (2006.01)

(52) U.S. Cl.
CPC ................ *B62D 1/184* (2013.01); *B62D 1/189* (2013.01)

(58) Field of Classification Search
CPC ......... B62D 1/184; B62D 1/187; B62D 1/189
See application file for complete search history.

(56) References Cited

U.S. PATENT DOCUMENTS 4,376,878 A * 3/1983 Iwata .................... B60Q 1/1469
200/61.27
4,656,887 A * 4/1987 Yoshida ................. B62D 1/184
74/493

(Continued)

FOREIGN PATENT DOCUMENTS

GB    2 235 960 A    3/1991
JP    03-094316 A    4/1991

(Continued)

OTHER PUBLICATIONS

Office Action issued Mar. 24, 2015, in Japanese Patent Application No. 2014-511628.

(Continued)

*Primary Examiner* — Laura Freedman
(74) *Attorney, Agent, or Firm* — Shapiro, Gabor and Rosenberger, PLLC

(57) ABSTRACT

A steering apparatus includes a steering shaft, a steering column rotatably supporting the steering shaft, a bracket supporting the steering column to a vehicle body, a fixing mechanism for fixing a position of the steering column and releasing the steering column, and an operation lever fitted to the fixing mechanism to switch over by a sway thereof the fixing and releasing of the steering column, the steering apparatus being thus capable of adjusting the position of the steering column, wherein the operation lever is provided with an operating portion disposed on a more rear side of a vehicle than a swaying center of the operation lever, and an extended portion extending on a more front side of the vehicle than the swaying center of the operation lever and being provided with a weight member. The configuration can prevent the fixed steering column from being released by an impact load.

9 Claims, 3 Drawing Sheets

(56) References Cited

U.S. PATENT DOCUMENTS

| | | | | |
|---|---|---|---|---|
| 4,722,241 A * | 2/1988 | Yoshida | ............... | B62D 1/183 74/493 |
| 4,723,461 A * | 2/1988 | Yoshida | ............... | B62D 1/184 74/493 |
| 5,088,343 A | 2/1992 | Yokoyama | | |
| 5,657,668 A * | 8/1997 | Hibino | ............... | B62D 1/184 74/493 |
| 6,036,228 A * | 3/2000 | Olgren | ............... | B62D 1/184 280/775 |
| 6,062,101 A * | 5/2000 | Higashino | ............ | B62D 1/184 74/493 |
| 6,543,807 B2 * | 4/2003 | Fujiu | ............... | B62D 1/184 280/775 |
| 6,637,285 B2 * | 10/2003 | Jolley | ............... | B62D 1/184 74/492 |
| 7,438,320 B2 * | 10/2008 | Sato | ............... | B62D 1/184 280/775 |
| 7,516,682 B2 * | 4/2009 | Schneider | ............ | B62D 1/184 280/775 |
| 7,717,011 B2 * | 5/2010 | Hirooka | ............... | B62D 1/184 280/777 |
| 7,810,409 B2 * | 10/2010 | Okada | ............... | B62D 1/184 280/775 |
| 8,171,819 B2 * | 5/2012 | Shimoyama | ......... | B62D 1/184 74/493 |
| 8,590,933 B2 * | 11/2013 | Narita | ............... | B62D 1/184 280/777 |
| 8,678,437 B2 * | 3/2014 | Narita | ............... | B62D 1/184 188/371 |
| 8,826,767 B2 * | 9/2014 | Maniwa | ............... | B62D 1/184 280/775 |
| 2005/0127656 A1 | 6/2005 | Sato et al. | | |
| 2007/0234845 A1 * | 10/2007 | Gist | ............... | B62D 1/184 74/569 |
| 2009/0241721 A1 * | 10/2009 | Inoue | ............... | B62D 1/195 74/493 |

FOREIGN PATENT DOCUMENTS

| | | | | |
|---|---|---|---|---|
| JP | 04-219562 A | | 8/1992 | |
| JP | 09-221043 A | | 8/1997 | |
| JP | 09267752 A | * | 10/1997 | |
| JP | 2002-046622 A | | 2/2002 | |
| JP | 2004-196079 A | | 7/2004 | |
| JP | 2004-268841 A | | 9/2004 | |
| JP | 2005-082069 A | | 3/2005 | |
| JP | 2005-153831 A | | 6/2005 | |
| JP | 2005-199733 A | | 7/2005 | |
| JP | 2007-062662 A | | 3/2007 | |
| JP | WO 2008056711 A1 * | | 5/2008 | ............ B62D 1/184 |
| JP | 2008-285064 A | | 11/2008 | |

OTHER PUBLICATIONS

Manual English translation of claim(s) and abstract of JP 04-219562 A, Aug. 10, 1992.

Manual English translation of claim(s) and abstract of JP 09-221043 A, Aug. 26, 1997.

Manual English translation of claim(s) and abstract of JP 2004-196079 A, Jul. 15, 2004.

English Translation of International Preliminary Report on Patentability from International Patent Application No. PCT/JP2013/084302, mailed Nov. 5, 2015.

* cited by examiner

STEERING APPARATUS

TECHNICAL FIELD

The present invention relates to a steering apparatus that is mounted on a vehicle and capable of adjusting a position of a steering wheel by releasing a steering column from being fixed through operating a lever.

BACKGROUND ART

A steering apparatus has hitherto existed, which includes an operation lever for switching over fixing a steering column and releasing the same from being fixed in order to enable a tilted position and a telescopic position of the steering wheel to be adjusted corresponding to a physique etc of a driver.

On the other hand, there exists a technique for elongating a distance between a clamping portion and an operating portion of the lever in order to lighten a lever operation for the purpose of attaining better operability of the lever.

In this type of steering apparatus, if the steering apparatus receives an impact such as when an on-moving vehicle undergoes a collision, an impact load and a moment of inertia of the lever operating portion cause the operation lever to sway on the side of releasing the steering column from being fixed, and it happens in some case that the steering column is released from being fixed.

The conventional steering apparatus is configured to be provided with a spring for biasing the operation lever toward the fixing side in a state where the steering column is fixed thereby preventing the operation lever from swaying on the side of releasing the steering column (refer to, e.g., Japanese Patent Application Laid-Open Publication No. 2008-285064).

SUMMARY OF THE INVENTION

Problems to Be Solved By the Invention

In the conventional steering apparatus, however, the operation lever is prevented from swaying on the releasing side by dint of a constant tensile force of the spring, and hence, if a load large enough to exceed the tensile force of the spring acts on the operation lever such as when the vehicle mounted with the steering apparatus undergoes the collision, such a possibility exists that the steering column is released from being fixed.

It is an object of the present invention, which was devised in view of the problems described above, to provide a steering apparatus configured to prevent the fixed steering column from being released due to the impact load.

Means for Solving the Problems

According to the present invention in order to solve the problems described above, a steering apparatus comprising: a steering shaft to transfer a steering force; a steering column to rotatably support the steering shaft; a vehicle body-sided bracket to support the steering column to a vehicle body; a fixing mechanism for fixing a position of the steering column and releasing the steering column from being fixed; and an operation lever fitted to the fixing mechanism, the operation lever being swayed to switch the fixing of the position of the steering column and the releasing of the steering column from being fixed, the steering apparatus being thus capable of adjusting the position of the steering column, wherein the operation lever includes an operating portion disposed at a more rear side of a vehicle than a swaying center of the operation lever, and an extended portion extending to a more front side of the vehicle than the swaying center of the operation lever and being provided with a weight member.

The extended portion prevents the operation lever from swaying in a releasing direction from the fixed state of the steering column. Namely, owing to the extended portion and the weight member, a center of gravidity of the operation lever can be approximated to a swaying center of the operation lever. With this contrivance, the moment in the swaying direction is reduced by the weight of the operating portion of the operation lever receiving the impact when encountering the collision. In other words, when producing the moment to sway toward the cancellation side the portion, on the more rear side of the vehicle, of the operation lever than the swaying center, the extended portion and the weight member produce a counter-moment against the moment described above. Note that the "operating portion" indicates a portion used for a driver to operate and sway the operation lever.

With this contrivance, even when a large impact load is applied to the steering apparatus, the steering column in a fixed state can be prevented from being released. Further, a force of operating the operation lever can be reduced.

Preferably, a portion, disposed on a more rear side of the vehicle than the swaying center, of the operation lever is composed of a plate and has a curved portion.

With this configuration, it is feasible to ensure a tool space for fitting a key lock etc.

Preferably, the weight member is heavier than a weight that balances the operation lever with the clamping bolt being centered.

Alternatively, in the state of fixing the position described above, a numerical value obtained by multiplying a horizontal distance in a front-and-back direction of the vehicle from a line of a central axis of the clamping bolt up to a center of gravidity of the weight member and said extended portion by weight of the weight member added by said extended portion, is to be larger than a numerical value obtained by multiplying the horizontal distance in the front-and-back direction of the vehicle from the line of the central axis of the clamping bolt up to the center of gravidity of the portion, on the rear side of the vehicle, of the operation lever by weight of the operation lever on the rear side of the vehicle.

With this contrivance, the increased moment of the portion of the operation lever configured by including said extended portion and the weight member makes the steering column harder to be released, thus providing safety.

Preferably, wherein the vehicle body-sided bracket includes a pair of overhanging portions extending to both sides of the steering column in a widthwise direction of the vehicle from an upper position of the steering column, the fixing mechanism is a cam clamping mechanism that includes a clamping bolt that is passing through the pair of overhanging portions, an annular movable cam fitted on the clamping bolt and rotatable by swaying of the operation lever and an annular fixed cam fitted on the clamping bolt and fixedly provided on the overhanging portion in a face-to-face relationship with the movable cam, the cam clamping mechanism changing distance between the movable cam and the fixed cam by rotation of the movable cam to clamp or release the steering column or a member fixed to the steering column, thereby switching the fixing and the releasing of the steering column, the movable cam and the fixed cam include, respectively, protruded portions protruding on the sides opposite to each other and having apex portions disposed in face-to-face contact positions when fixing the position and inclined portions extending in a substantially circumferential direction from the apex portions to bridge between the apex portions and other portions with inclined surfaces and disposed in such positions as to mutually slide on each other when switching the fixing of the position and the releasing thereof, and each of the inclined portions has a lower portion whose an angle of inclination is larger than an angle of inclination of a portion vicinal to the apex portion.

The lower portion having the large angle of inclination, when releasing the steering column and when the operation lever is to sway on the side of fixing the position by dint of the weight member, abuts on the protruded portion of the movable cam, thereby preventing a further sway. Note that the "lower portion" connotes a portion, on a farther side from the apex, of the inclined portion.

This contrivance makes it possible to prevent hindrance of adjusting the position in such a manner that the operation lever moves on the side of fixing the position by dint of the weight of the extended portion when the driver adjusts the position of the steering wheel underway.

Preferably, the operation lever is formed of a resin in its entirety.

With this contrivance, the operation lever decreases in weight, while the moment of inertia of the operation lever is reduced, and the operation lever thereby becomes hard to sway when the impact load is applied, which contributes to a reduction in weight of the vehicle etc mounted with the steering apparatus.

Preferably, the adjustment of the position of the steering column is to adjust a tilted position.

This contrivance enables the position of the steering wheel to be adjusted to a proper position in accordance with a physique etc of the driver.

Effect of the Invention

According to the present invention, it is feasible to provide the steering apparatus configured to prevent the steering column from being released due to the impact when the vehicle undergoes the collision.

BRIEF DESCRIPTION OF THE DRAWINGS

FIG. 3A shows a plan of a fixed cam; and FIG. 3B shows an enlarged section of a contact portion between the fixed cam and a movable cam.

MODE FOR CARRYING OUT THE INVENTION

Figure 1:
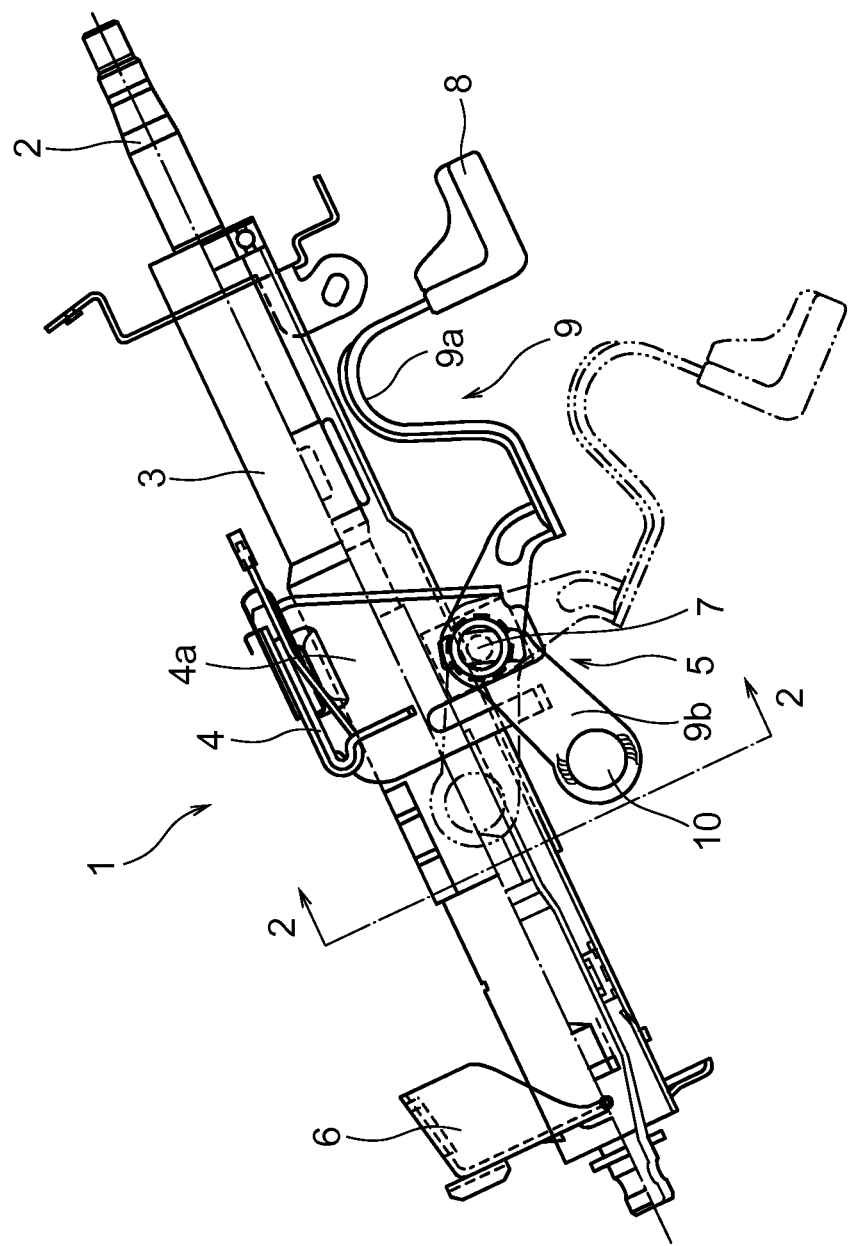
FIG. 1 is a side view of a steering apparatus according to an embodiment of the present application.

An embodiment of the present invention will hereinafter be described with reference to FIGS. 1 to 3B. FIG. 1 is a side view illustrating a steering apparatus according to the embodiment of the present application. FIG. 1 depicts sections of some portions of a steering column and a steering shaft.

A steering apparatus 1, which is composed mainly of a metal, is configured to include a steering shaft 2 that transfers a rotation of a steering wheel (unillustrated) to be fitted onto an end portion on a rear side (a right side as viewed in FIG. 1) of a vehicle to a front side (a left side as viewed in FIG. 1) of the vehicle, a steering column 3 that rotatably supports the steering shaft 2, a rear-sided bracket 4 that fixes a portion of the steering column 3 vicinal to the center thereof to a vehicle body, a cam clamping mechanism 5 that fixes the steering column 3 and releases the steering column 3 from being fixed by use of a cam, and a font-sided bracket 6 that fits a portion, on the front side of the vehicle, of the steering column 3 to the vehicle body in a swayable manner, and is thus configured to adjust a tilted position.

The rear-sided bracket 4 includes a pair of overhanging portions 4a, 4b (the overhanging portion 4b is not shown in FIG. 1) extending on both sides of the steering column 3 in a widthwise direction of the vehicle from upper position of the steering column 3. The overhanging portions 4a, 4b has elongate holes extending in a tilt adjusting direction and being formed in face-to-face positions. A clamping bolt 7 building up the cam clamping mechanism 5 is inserted into the elongate holes.

A tilt adjusting lever 9 (an operation lever) is configured to be swayable about the clamping bolt 7, in which a driver sways the tilt adjusting lever 9 by operating a lever knob 8 (an operating portion), thus fixing the steering column 3 and releasing the fixing thereof. The steering column 3 is released from being fixed when pushing down the lever knob 8, while the steering column 3 is fixed when pulling up the lever knob 8. FIG. 1 illustrates a state in which the steering column 3 is fixed by the tilt adjusting lever 9 depicted by solid lines and a state in which the steering column 3 is released from being fixed by the tilt adjusting lever 9 depicted by two-dotted chain lines.

A portion, on the front side of the vehicle, of the tilt adjusting lever 9 is composed of a plate whose plane is disposed substantially perpendicular to the widthwise direction of the vehicle, and is provided with a through hole into which the clamping bolt 7 is inserted. An extended portion 9b is formed on the more front side of the vehicle than the clamping bolt 7, and a cylindrical weight member 10 is attached to a portion, on the front side of the vehicle, of an end portion of the extended portion 9b and on the left side of the vehicle (the near side as viewed in FIG. 1). The weight member 10 may be made of metal such as iron and steel or resins as material thereof, and may also be formed of the resin integrally with the tilt adjusting lever 9. The weight member 10 is heavier than a weight that balances the tilt adjusting lever 9 with the clamping bolt 7 being centered.

The plate, on the rear side of the vehicle, of the tilt adjusting lever 9 is bent in an L-shape on a more rear side of the vehicle than the clamping bolt 7, and extends so as to be broad in width toward the rear side of the vehicle in the widthwise direction of the vehicle. The lever knob 8 made of the resin is attached to the end portion of the tilt adjusting lever 9 on the rear side of the vehicle, and a curved portion 9a being curved upward adjacent to the lever knob 8. The curved portion 9a is a portion for providing a tool space for fitting a key lock. This configuration results in an elongated distance between a center of the swaying movement of the tilt adjusting lever 9 and the lever knob 8.

Figure 2:
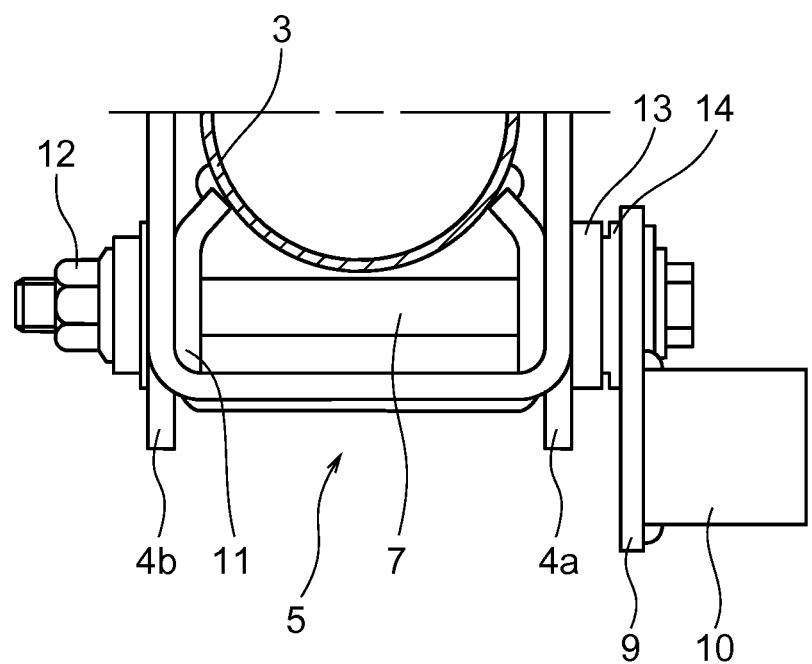
FIG. 2 is an enlarged sectional view illustrating a cam clamping mechanism of the steering apparatus according to the embodiment of the present application.

FIG. 2 is an enlarged sectional view illustrating the cam clamping mechanism 5 of the steering apparatus 1 according to the embodiment of the present application. FIG. 2 illustrates a section taken along the line 2-2 in FIG. 1.

A distance bracket 11 is fixed to a lower portion of the steering column 3. The distance bracket 11 is formed with through-holes in the widthwise direction of the vehicle, and the clamping bolt 7 is inserted through the through-holes.

The distance bracket 11 slidably abuts on the overhanging portions 4a and 4b in the state where the steering column 3 is released from being fixed, and moves up and down together with the steering column 3 and the clamping bolt 7. While on the other hand, in the state where the steering column 3 is fixed, the distance bracket 11 is pinched by the overhanging portions 4a and 4b so that the steering column 3 is supported on the rear-sided bracket 4.

A nut 12 is screwed onto a tip of the clamping bolt 7, and the distance bracket 11, the overhanging portions 4a, 4b and the tilt adjusting lever 9 are disposed between a head of the clamping bolt 7 and the nut 12. Further, a fixed cam 13 and a movable cam 14, which are fitted on the clamping bolt 7, are interposed between the tilt adjusting lever 9 and the overhanging portion 4a. A portion, on the side of the overhanging portion 4a, of the fixed cam 13 is formed with a rectangular engagement portion 13a (see FIG. 3A), and this engagement portion 13a is inserted into an elongate hole formed in the overhanging portion 4a. A dimension of the engagement portion 13a in a front-back direction of the vehicle is set slightly smaller than a dimension of the elongate hole in the front-back direction of the vehicle, and hence the fixed cam 13 is configured to be disabled from rotating about the clamping bolt 7 while being movable in the tilt adjusting direction. On the other hand, the movable cam 14 also is provided with a rectangular engagement portion (not shown) on the side of the tilt adjusting lever 9 and is configured to be rotatable together with the tilt adjusting lever 9.

Figure 3A:
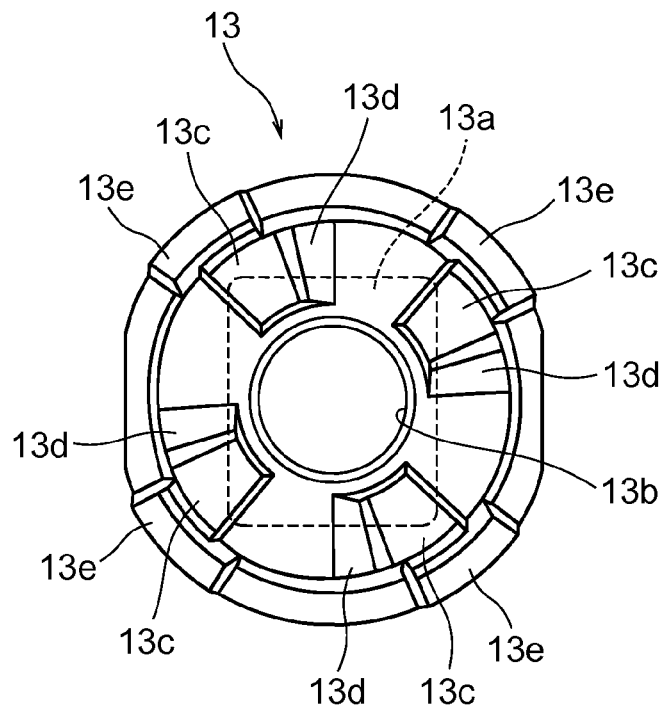
FIGS. 3A and 3B are views each illustrating cams of the steering apparatus according to the embodiment of the present application.
Figure 3B:
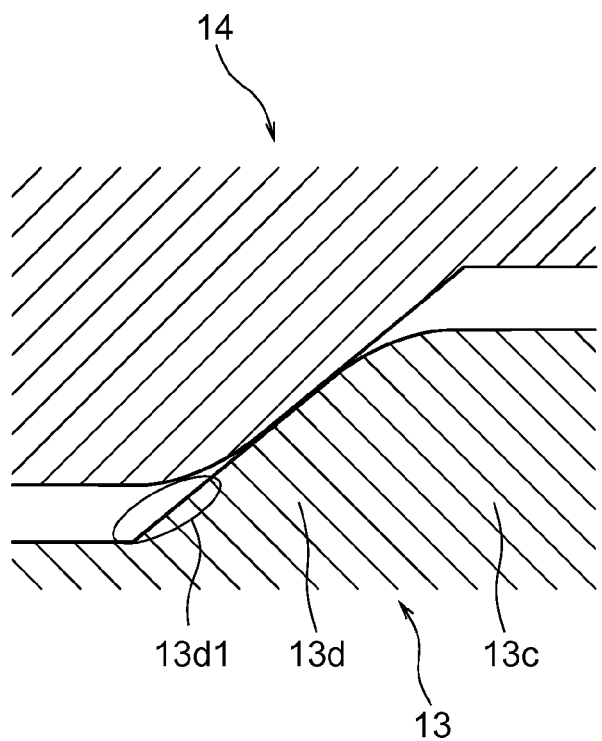

FIGS. 3A and 3B are views each illustrating the fixed cam 13 of the steering apparatus 1 according to the embodiment of the present application. FIG. 3A depicts a plan, on the side of the movable cam 14, of the fixed cam 13, and FIG. 3B depicts an enlarged section of a contact potion between the fixed cam 13 and the movable cam 14.

As depicted in FIG. 3A, a portion, on the side of the overhanging portion 4a (a backside of the plan illustrated in FIG. 3A), of the fixed cam 13 is formed with the engagement portion 13a described above. A central portion of the fixed cam 13 is formed with a central hole 13b through which to let the clamping bolt 7. A portion, on the side of the movable cam 14, of the fixed cam 13 is formed with four pieces of protruded portions 13c at equal intervals in a circumferential direction around the periphery of the central hole 13b, and each of the protruded portions 13c includes an inclined portion 13d on one side in the circumferential direction. The inclined portion 13d bridges, through an inclined surface thereof, between an apex of the protruded portion 13c and a surface thereof not formed with the protruded portion 13c on the side of the movable cam 14.

Four pieces of stoppers 13e for regulating the fixed cam 13 and the movable cam 14 not to make a relative rotation over a given angle are formed on the external sides of the protruded portions 13c in the radial directions at equal intervals in the circumferential direction in a way that protrudes on the side of the movable cam 14. The stoppers 13e abut against the similar stoppers formed on the movable cam 14, thereby regulating the relative rotation. The movable cam 14 takes the same shape as the shape of the fixed cam 13 and is disposed in a manner that faces the side formed with the protruded portions.

FIG. 3B illustrates an enlarged section of the contact portion between the fixed cam 13 and the movable cam 14 in an intermediate position between a state of fixing the steering column 3 and a state of releasing the steering column from being fixed. In the intermediate position, the inclined portion of the fixed cam 13 abuts on the inclined portion of the movable cam 14, from which state when the tilt adjusting lever 9 is operated toward the fixing side, the movable cam 14 moves on the right side as viewed in FIG. 3B, then the inclined surfaces thereof slidably abut on each other to move upward, and the movable cam 14 stops in such a position that the protruded portions face each other and the stoppers abut on each other. Through this operation, the fixed cam 13 and the movable cam 14 are distanced, and hence a pressure occurs between members disposed between the head of the clamping bolt 7 and the nut 12, with the result that the distance bracket 11 is fixed to the rear-sided bracket 4.

On the other hand, when operating the tilt adjusting lever 9 toward the releasing side from the intermediate position shown in FIG. 3B, the movable cam 14 moves on the left side as viewed in FIG. 3B and meshes with the fixed cam 13 with the distance being reduced, and the distance bracket 11 is thus released from being fixed, thereby enabling the tilt of the steering column 3 to be adjusted.

As described above, the weight member 10 is heavier than the weight (or the quantity of heaviness) that balances the tilt adjusting lever 9 with the clamping bolt 7 being centered, and it is therefore considered that the tilt adjusting lever 9 sways on the fixing side and hinders the adjustment of the tilted position on such an occasion that the driver releases the steering column in order to adjust the tilted positon of the steering column 3. This being the case, such a configuration is taken that the movable cam 14 gets hard to run up on the protruded portion 13c of the fixed cam 13 by making an angle of inclination of a lower portion 13d1 of the inclined portion 13d larger than the portion in the vicinity of the apex of the protruded portion 13c, thereby making the tilt adjusting lever 9 hard to sway on the fixing side when the steering column 3 is released from being fixed.

According to the present embodiment, the following effects can be acquired. To be specific, if the vehicle traveling with the steering column 3 being fixed collides with another vehicle etc (a primary collision) or if the primary collision happens and then the driver collides with the steering wheel (a secondary collision), the steering apparatus 1 undergoes a large impact, and the tilt adjusting lever 9 thereby receives a force by which the tilt adjusting lever 9 is released from being fixed, however, the extended portion 9b and the weight member 10 can resist against the force and prevent the steering column 3 from being released.

For example, in FIG. 1, the impact to move the steering column 3 upward is applied, in which case a moment of inertia of a portion of the tilt adjusting lever 9 that is closer to the side (the rear side of the vehicle) of the lever knob 8 than the clamping bolt 7 applies a force to sway the tilt adjusting lever 9 clockwise about the clamping bolt 7, however, simultaneously the moments of the inertia of the extended portion 9b and the weight member 10 apply a force to sway the tilt adjusting lever 9 counterclockwise about the clamping bolt 7, whereby the steering column 3 can be prevented from being released. As described above, a reason why the weight member 10 is heavier than the weight (that is, the quantity of heaviness) that balances the tilt adjusting lever 9 with the clamping bolt 7 being centered, is that it is generally difficult to predict a magnitude of an impact load, and hence a safety scheme is attained to make it much harder to release the steering column 3 by increasing the moments of inertia of the extended portion 9b and the weight member 10.

If the distance from the clamping bolt 7 to the lever knob 8 is made larger, it is feasible to conduct fixing and releasing operations of the tilt adjustment with a light feeling (a smooth feeling), while on the other hand the moment of inertia with the clamping bolt 7 being centered in rotation becomes lager, and the impact causes the steering column 3 be released easier. Further, as in the present embodiment, the tilt adjusting lever 9 includes the curved portion 9a, in which case the curved portion 9a is easy to generate action of the plate spring, with the result that vibrations facilitate releasing the steering column 3 from being fixed. Accordingly, the contrivance described above is effective especially in those cases.

Moreover, in the invention described in Patent document 1, there are restrains in terms of the position of the tilt adjusting lever, the position of the stopper for the tilt adjusting lever, a hooking position of the spring and a characteristic of the spring load, which lead to poor versatility because of a limited fitting space, however, the present embodiment has none of these restraints and can be therefore versatile. In the case of employing particularly the cam mechanism, as described above, since the cam mechanism is provided with the stopper in many instances, it is difficult to hook the spring on the stopper of the tilt adjusting lever, and a necessity for newly providing a spring hook arises as in the invention described in Patent document 1, however, the present embodiment does not have such a necessity.

The specific embodiment has been discussed so far in order to describe the invention of the present application, however, the invention of the present application can be, without being limited to this embodiment, modified and improved in a variety of modes.

For instance, the embodiment discussed above has exemplified the steering apparatus capable of adjusting the tilted position, and can be applied to a steering apparatus capable of adjusting a telescopic position by swaying the tilt adjusting lever and also to a steering apparatus capable of adjusting both of the tilted position and the telescopic position by swaying the tilt adjusting lever.

Furthermore, the weight member attached to the extended portion may also be formed integrally with the extended portion, and the shape thereof is not limited to the cylindrical shape. It is preferable that the center of gravity of the weight member and the extended portion is disposed in a position which is line-symmetric with the center of gravity of the portion, on the more rear side of the vehicle than the central axial line of the clamping bolt, of the tilt adjusting lever with respect to the central axial line of the clamping bolt. However, the rear-sided bracket provided with the tilt adjusting lever needs to ensure the tool space for assembling the fitting portion to the vehicle body and is restrained in terms of support rigidity, visual recognizability of a meter and a heightwise space pertaining to ensuring a space around the knees, and therefore the position thereof can be determined in a manner that takes interference with other components and spaces into consideration without being limited to the position described above, and the shape of the extended portion can be also changed corresponding thereto.

The weight member may be so set that tilt adjusting lever may be balanced with the clamping bolt being centered and may also be set lighter than the weight (or the quantity of heaviness) balancing the tilt adjusting lever. Even when being set lighter than the weight (that is, the quantity of heaviness) balancing the tilt adjusting lever, there exist such other forces of preventing the tilt adjusting lever from swaying as a frictional force between the cams and a frictional force between the tilt adjusting lever and a metal washer disposed on the bolt head side, and the steering column can be prevented from being released by its being supplemented with these forces.

The fixing and the releasing of the steering column may involve adopting, without being limited to the cam clamping mechanism of switching over the fixing and the releasing by the movable cam and the fixed cam, such mechanisms if configured to sway the lever as to switch over the fixing and the releasing of the steering column by the driver's swaying the tilt adjusting lever to fasten or loosen the screw and also known fixing mechanisms other than those described above.

The tilt adjusting lever can adopt a variety of shapes and may be a lever not provided with the curved portion. The operating direction of the tilt adjusting lever may be set such that the steering column is released from being fixed when operating the tilt adjusting lever upward but is fixed when operating the tilt adjusting lever downward.

As discussed above, the invention of the present application can provide the steering apparatus configured to prevent the steering column from being released by the impact load.

What is claimed is:

1. A steering apparatus comprising:
a steering shaft to transfer a steering force;
a steering column to rotatably support the steering shaft;
a vehicle body-sided bracket to support the steering column to a vehicle body;
a fixing mechanism for fixing a position of the steering column and releasing the steering column from being fixed; and
an operation lever fitted to the fixing mechanism, the operation lever being swayed to switch the fixing of the position of the steering column and the releasing of the steering column from being fixed, the steering apparatus being thus capable of adjusting the position of the steering column,
wherein the operation lever includes an operating portion disposed at a more rear side of a vehicle than a rotation center of the operation lever, and an extended portion extending to a more front side of the vehicle than a swaying center of the operation lever and being provided with a weight member, and
wherein the weight member is heavier than a weight that balances the operation lever with a clamping bolt being centered.

2. The steering apparatus according to claim 1, wherein a portion, disposed on a more rear side of the vehicle than the swaying center, of the operation lever is composed of a plate and has a curved portion.

3. The steering apparatus according to claim 1, wherein the vehicle body-sided bracket includes a pair of overhanging portions extending to both sides of the steering column in a widthwise direction of the vehicle from an upper position of the steering column,
the fixing mechanism is a cam clamping mechanism that includes a clamping bolt that is passed through the pair of overhanging portions, an annular movable cam fitted on the clamping bolt and rotatable by swaying the operation lever and an annular fixed cam fitted on the clamping bolt and fixedly provided on one the overhanging portions in a face-to-face relationship with the movable cam, the cam clamping mechanism changing distance between the movable cam and the fixed cam by rotation of the movable cam to clamp or release the steering column or a member fixed to the steering column, thereby switching the fixing and the releasing of the steering column,
the movable cam and the fixed cam include, respectively, protruded portions protruding on the sides opposite to each other and having apex portions disposed in face-to-face contact positions when fixing the position and inclined portions extending in a substantially circumferential direction from the apex portions to bridge between the apex portions and other portions with inclined surfaces and disposed in such positions as to mutually slide on each other when switching the fixing of the position and the releasing thereof, and each of the inclined portions has a lower portion whose angle of inclination is larger than an angle of inclination of a portion vicinal to the apex portion.

4. The steering apparatus according to claim 1, wherein the operation lever is formed of a resin in its entirety.

5. The steering apparatus according to claim 1, wherein the adjustment of the position of the steering column is to adjust a tilted position.

6. A steering apparatus comprising:
a steering shaft to transfer a steering force;
a steering column to rotatably support the steering shaft;
a vehicle body-sided bracket to support the steering column to a vehicle body;
a fixing mechanism for fixing a position of the steering column and releasing the steering column from being fixed; and
an operation lever fitted to the fixing mechanism, the operation lever being swayed to switch the fixing of the position of the steering column and the releasing of the steering column from being fixed, the steering apparatus being thus capable of adjusting the position of the steering column,
wherein the operation lever includes an operating portion disposed at a more rear side of a vehicle than a rotation center of the operation lever, and an extended portion extending to a more front side of the vehicle than a swaying center of the operation lever and being provided with a weight member,
the vehicle body-sided bracket includes a pair of overhanging portions extending to both sides of the steering column in a widthwise direction of the vehicle from an upper position of the steering column,
the fixing mechanism is a cam clamping mechanism that includes a clamping bolt that is passed through the pair of overhanging portions, an annular movable cam fitted on the clamping bolt and rotatable by swaying the operation lever and an annular fixed cam fitted on the clamping bolt and fixedly provided on one of the overhanging portions in a face-to-face relationship with the movable cam, the cam clamping mechanism changing distance between the movable cam and the fixed cam by rotation of the movable cam to clamp or release the steering column or a member fixed to the steering column, thereby switching the fixing and the releasing of the steering column,
the movable cam and the fixed cam include, respectively, protruded portions protruding on the sides opposite to each other and having apex portions disposed in face-to-face contact positions when fixing the position and inclined portions extending in a substantially circumferential direction from the apex portions to bridge between the apex portions and other portions with inclined surfaces and disposed in such positions as to mutually slide on each other when switching the fixing of the position and the releasing thereof, and
each of the inclined portions has a lower portion whose angle of inclination is larger than an angle of inclination of a portion vicinal to the apex portion.

7. The steering apparatus according to claim 6, wherein a portion, disposed on a more rear side of the vehicle than the swaying center, of the operation lever is composed of a plate and has a curved portion.

8. The steering apparatus according to claim 6, wherein the operation lever is formed of a resin in its entirety.

9. The steering apparatus according to claim 6, wherein the adjustment of the position of the steering column is to adjust a tilted position.

\* \* \* \* \*